UNITED STATES PATENT OFFICE.

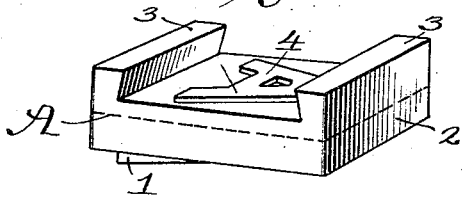
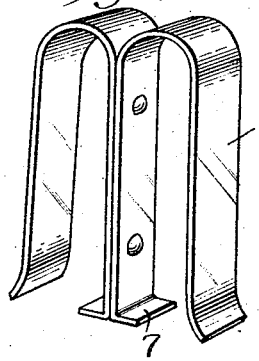
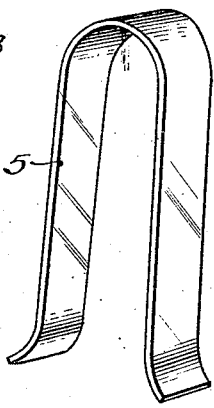
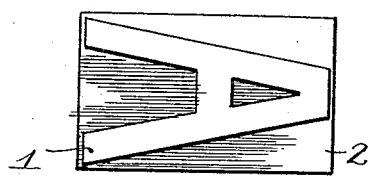
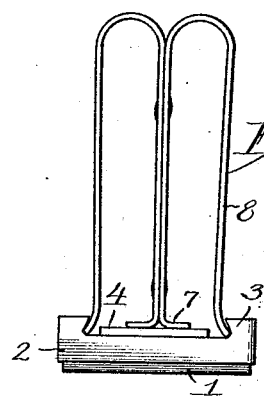
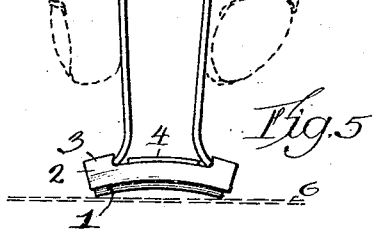
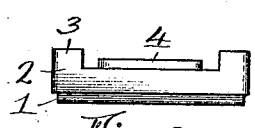
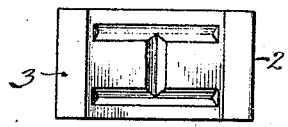
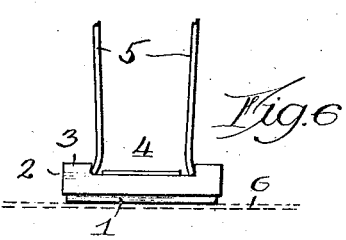

HANS H. HELLESOE, OF CHICAGO, ILLINOIS.

RUBBER TYPE.

1,420,376.  Specification of Letters Patent.  Patented June 20, 1922.

Application filed December 24, 1921. Serial No. 524,658.

*To all whom it may concern:*

Be it known that I, HANS H. HELLESOE, citizen of the United States, residing at Chicago, in the county of Cook and State of Illinois, have invented certain new and useful Improvements in Rubber Type; and I do hereby declare the following to be a full, clear, and exact description of the invention, such as will enable others skilled in the art to which it appertains to make and use the same.

My invention relates to rubber type and means for manipulating the same, its general objects being those of providing both the rubber type and the manipulating means in forms having decided advantages over those heretofore in use, including the advantages of low cost, compact storage and light shipping weight.

Where rubber types have heretofore been used for marking price tags, signs and the like, or for use by children in both school and in play, it has been customary to mount each type on a separate piece of molding which affords a handle for manipulating the same. Such a mounting involves a considerable addition in the cost of producing the type and also requires a considerably greater storage space than that needed for the rubber type portion itself, thereby greatly increasing the size and cost of the boxes required for sets of such type and likewise increasing the cost of transportation.

In one of its aspects, my invention aims to reduce both the cost, the required storage space and the weight of such sets of type, by providing unmounted types all adapted to be easily and effectively manipulated by a single holder; and by providing a simple, compact and inexpensive holder particularly suited for such manipulation. In a further aspect, my invention aims to provide such types on their backs with suitable designations corresponding to the type faces, and aims to arrange these designating markings so that they will not interfere with the grasping of the type by the holder, and so that they will not be apt to receive ink or to have any impressions made unintentionally from the same. Moreover, my invention aims to arrange the type and the holding means so as to employ a spring gripping of the type by the holder without unduly curving the type when this is used in relatively short lengths, and likewise aims to provide means upon the holder for correcting a curving of relatively long types so as to insure a clear impression from the same. Still further and also more detailed objects will appear from the following specification and from the accompanying drawings, in which—

Fig. 1 is a perspective view of a rubber type corresponding to a capital A and embodying my invention.

Fig. 2 is a bottom view of the same.

Fig. 3 is a perspective view of a simple metal holder adapted for use with the type of Fig. 1.

Fig. 4 is a similar perspective view of a metal holder equipped with a presser foot and adapted for use with a longer type of the general form of that shown in Fig. 1.

Fig. 5 is an elevation illustrating the type of Fig. 1 as gripped by the holder of Fig. 3 and showing the curvature imparted to the same by the resiliency of the holder when the type is made of relatively soft rubber.

Fig. 6 is a similar elevation showing how the face of the type is flattened out by the pressure of the holder in imprinting on a sheet of paper resting upon a flat surface.

Fig. 7 is an elevation of a holder of the form of Fig. 4 and of a type engaged by the same, showing how the presser foot prevents a curving corresponding to that of Fig. 5.

Fig. 8 is an elevation of another type embodying my invention and having square ledge formations at its back.

Fig. 9 is a similar elevation of a type having opposed grooves in its rearwardly projecting ledges and having the designating marking on its back in the form of a recessed letter.

Fig. 10 is a plan view of the type of Fig. 9.

In accomplishing the purposes of my invention after the manner of the accompanying drawings, I desirably make each type face 1 integral with the lower face of a rubber body 2 and equip this rubber body at its ends with a pair of upwardly projecting ledges 3 so as to afford a transverse groove at the top of the type. Then I also mold on the bottom of this groove 4 a letter corresponding to the type face 1, this letter being shown in Figs. 1 and 2 as raised above the back and as having its ends spaced by a considerable distance from the ledges 3.

To manipulate such types, I provide a resilient holder 5, desirably made of strip metal and having its ends normally sprung apart by the resiliency of the metal for a greater distance than that between the ledges 3 on each of the types, it being understood that the types comprising the font all have backs of uniform length. Such a holder can readily be grasped between the thumb and a finger of one hand and by slightly pressing its two shanks towards each other, the free ends can readily be inserted in the groove on the back of the selected type. As soon as the pressure is released, the resilient holder causes the shanks to spread apart into engagement with the opposed walls of the ledges 3 after the general manner shown in Fig. 5, thus interlocking the holder firmly with the type. The type can then be manipulated by the holder just as if it had been permanently fastened to the latter, but also can instantly be dropped from the holder by pressing the shanks of the latter slightly towards each other.

Being unmounted, the types comprising each font occupy much less space than that required for the corresponding type when mounted on pieces of molding, and the total weight is also greatly reduced, while the cost of the single holder is very much less than that involved in providing each type with a separate handle of wooden molding or the like. Consequently, I am able to effect a large reduction both in the total cost, the size and weight of the packages, and the transportation costs.

Furthermore, since a relatively low height of type face is ample for the designating portion 4, this can readily have its top disposed considerably below the top of the ledges 3, so as to prevent an inadvertent overturning of the type and inking of the face 4. The ledges 3 therefore act as guards for preventing an unintentional inversion, such as would lead to irregularities in the size of the imprinted letters or figures. Moreover, the metal of which the holder is made can be relatively thin, so that I can easily allow ample space between the ledges 3 and the ends of the designating type face 4 to avoid having the latter interfere with the application and use of the holder.

In constructing type according to my invention, the grade of rubber employed may be varied considerably, and if desired, the main body and face portion (as for example the portion below the line A in Fig. 1) may be made of a softer rubber than that above this line. Such a two-grade rubber construction will enable me to make the back portion of relatively hard rubber so that the resiliency of the holder will not be able to bend the type materially. Otherwise, this resiliency may spring the type into a form conveying its imprinting face, such as that shown in Fig. 5. However, I have found in practice that even if the entire type is made of a rubber soft enough to flex the body and face after the manner of Fig. 5, the downward pressure on the holder in printing with the type will overcome this flexing and insure a uniform imprinting for the entire length of the type face, provided that this type face is not unusually long. To accomplish this purpose, I desirably make the imprinting type faces of substantially the full length of the type body, so that the downward pressure on the shanks of the holder will be applied at some distance from the ends of this type face. Consequently, since the ends of the concave type face will engage the sheet of paper or cardboard 6 first when applied to the same as shown in Fig. 5, a downward pressure on the holder will flex the type face about its ends and will press it substantially flat as shown in Fig. 6.

However, in case the type body is unusually long, and particularly in case the type face is shorter than the distance between the ledges on the back of the type, as shown in Fig. 7, this applied pressure may not be ample for overcoming the flexing of the type body when the latter is made of relatively soft rubber. For such uses, I desirably provide the needed holder with a presser foot 7 presenting a flat face disposed substantially in the same planes with the ends of the resilient shanks of the holder, as for example by constructing the holder of two spring metal forks having their adjacent shanks riveted to each other and bent outwardly after the manner shown in Fig. 4. When such a holder is applied to the type after the manner shown in Fig. 7 so that the outer shanks 8 hook into the lower opposed portions of the ledges on the back of the type, the presser foot portion 7 will engage this back (or the type face on the latter) thereby preventing an upward bulging of this back and hence maintaining the type face flat.

However, while I have illustrated and described both the type and the holder of my invention in highly desirable embodiments I do not wish to be limited to the details of construction and arrangement thus disclosed, nor to the materials mentioned or the purposes for which the resulting articles may be employed. Obviously, many changes may be made in all of these respects without departing from the spirit of my invention or from the appended claims. For example, Fig. 7 shows an elevation of a type in which the inner walls of the ledges are parallel to each other and perpendicular to the type face instead of converging towards each other upwardly after the manner of the dovetail groove formation of Fig. 1, the use of such parallel wall grooves being quite feasible with type bodies of soft rubber as the tips of the holder arms indent these walls sufficiently to insure a firm gripping of the type by the same.

Fig. 8 shows a type in which the two ledges are undercut on their opposed faces so that the outwardly bent types of the holder can hook into these grooves, this being a construction feasible with incompressible type backs. Likewise, the dotted lines of the same figure indicate the recessing of the designating letter, which recessing is also shown in full lines in the plan view of Fig. 9.

I claim as my invention:—

1. A type having a transverse groove upon its back, the opposed walls of the groove being resilient to adapt them to be indented by the spreading arm tips of a holder.

2. A type having a transverse groove upon its back and having upon the bottom of the groove a designating marking corresponding to the face of the type.

3. A type having a transverse groove upon its back and having upon the bottom of the groove a designating marking corresponding in its designation to the face of the type but spaced from the walls of the groove to permit the inserting of holder arms therebetween.

4. A type having a transverse groove upon its back and having upon the bottom of the groove a designating marking corresponding to the face of the type, the top of the designating marking being below the mouth of the groove.

Signed at Chicago, Illinois, December 20, 1921.

HANS H. HELLESOE.